G. HUETTNER.
LOCK NUT.
APPLICATION FILED JUNE 20, 1914. RENEWED MAR. 30, 1916.
1,204,275. Patented Nov. 7, 1916.
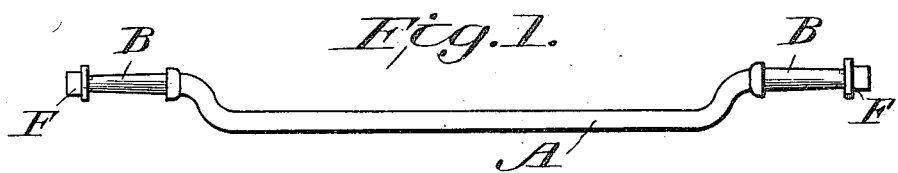
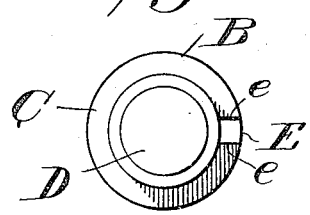
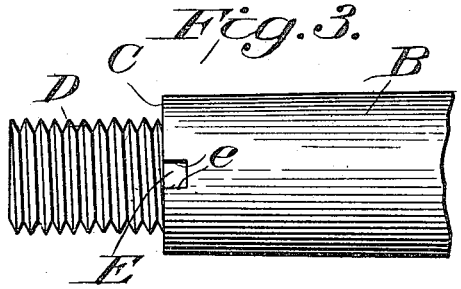
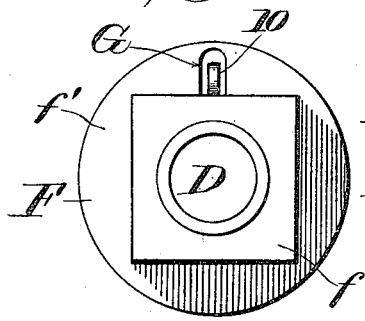
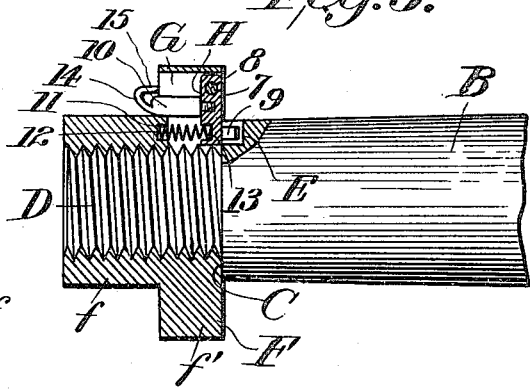
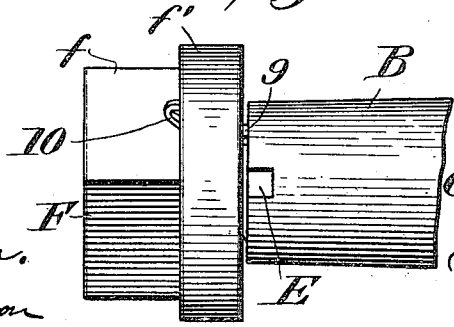
Witnesses
C. H. Walker.
Chas. E. Riordan.
Inventor
George Huettner,
By
Frederick V. Winters,
his Attorney.

UNITED STATES PATENT OFFICE.

GEORGE HUETTNER, OF NEW YORK, N. Y.

LOCK-NUT.

1,204,275.  Specification of Letters Patent.  Patented Nov. 7, 1916.

Application filed June 20, 1914, Serial No. 846,349. Renewed March 30, 1916. Serial No. 87,855.

*To all whom it may concern:*

Be it known that I, GEORGE HUETTNER, a citizen of the United States, residing at New York city, in the county of Bronx and State of New York, have invented certain new and useful Improvements in Lock-Nuts, of which the following is a full, clear, and exact specification.

This invention relates to lock-nuts, and has for its object to provide an improved nut for vehicle axles having means for automatically locking the same to the axle in its fully turned on position, whereby said nut cannot work loose or fall off causing breakage of the vehicle and possibly injury to the occupants of the same.

One special object of the invention is to provide a locking device which while it can be easily released by hand, is so constructed and disposed on the nut that it is not apt to be released by an accidental striking of its operating piece, the releasing movement of said operating piece being away from the side of the nut instead of toward the same, so that blows struck on the outside of said operating piece, as they would necessarily be directed by accident, cannot effect the release of the locking device.

Other objects will appear as the description proceeds.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views:—Figure 1 is a side view of an axle equipped with lock-nuts constructed in accordance with this invention. Fig. 2 is an end view of the axle spindle, the same being drawn to an enlarged scale. Fig. 3 is a side view of the outer end portion of one of the spindles, with the nut removed, as in Fig. 2. Fig. 4 is an end view of the spindle with the nut attached. Fig. 5 is a side view of the same, with the nut in section, and Fig. 6 is a side view of the spindle and nut showing how the locking device is automatically brought into locking position as the nut is turned "home".

In Fig. 1, A indicates a common form of vehicle axle to which the present invention may be applied. Said axle has spindles B, B at its opposite ends to receive the wheels (not shown). As illustrated better in Figs. 2 to 6, inclusive, there is a shoulder or abutment C formed at the junction of the spindle proper and the threaded portion D on which the nut fits. In this shoulder C a notch E is formed with abrupt walls *e* preferably arranged axially of the spindle.

The nut F is bored and threaded to fit the threaded portion D of the spindle, and has an angular outer part *f* to receive a wrench, and an annular flange *f'* at its inner end which abuts against the shoulder C of the spindle when the nut is screwed on. Formed partly in this flange *f'* and partly in the body of the nut is a chamber G in which the locking member H is pivoted, as best shown in Fig. 5. Said locking member comprises a plate 7 pivoted at 8 near the periphery of the flange *f'*, at the outer end of the chamber G, a locking lug 9 projecting from the plate 7 to engage the notch E in the shoulder C of the spindle, an operating piece 10 projecting from the chamber G on the outer face of the flange, and a spring 11 for normally holding the plate in the position illustrated in Fig. 5 with the lug 9 projected into notch E.

The spring is housed in the inner portion of the chamber G within the body of the nut and is retained by having its ends seated in sockets 12 and 13 in the nut and plate 7, respectively. The operating piece 10 is connected to the plate 7 intermediate of the pivot 8 and the free end of said plate which carries the lug 9, and serves to protect the spring from the outside. The end portion of said operating piece, which projects from the chamber G, engages the outer surface of the angular portion *f* and constitutes a stop for the plate 7 under the influence of the spring. The inner face 14 of the projecting end of the operating piece, is beveled or rounded off to permit the end of the finger to be introduced between it and the outer face of the nut for swinging said outer end of the operating piece outward to withdraw the locking lug 9 from the notch E when it is desired to release and remove the nut. The outer face 15 of said projecting end of the operating piece, is preferably parallel to the outer face of the nut and arranged about in line with the pivot 8 so that a blow struck on the extremity of said projecting end of the locking piece or on its outer face 15 cannot effect the release of the locking member.

The movement of the locking lug 9 to and from locked position is in an axial direction with respect to the spindle. Consequently, when the nut is turned on and nears its seat against the shoulder C, said lug 9 will come in contact with said shoulder and be gradually and automatically retracted, as shown in Fig. 6, until it comes opposite the notch E, when it will be projected into locking engagement with said notch by the spring.

Having thus described my invention, what I claim as new and desire to secure by Letters Patent of the United States is:—

1. The combination with a nut having a chamber formed radially therein, of a ratchet locking device pivoted at its outer end in said chamber, the nut having a lateral wall projecting beyond said chamber, and an operating piece carried by said locking device and normally engaging said projecting lateral wall of the nut, whereby said operating piece must be moved outwardly in a radial line for releasing the locking device.

2. The combination with a nut having a chamber formed radially therein, of a ratchet locking device pivoted at its outer end in said chamber, the nut having a lateral wall projecting beyond said chamber, and an operating piece carried by said locking device and normally engaging said projecting lateral wall of the nut, whereby said operating piece must be moved outwardly in a radial line for releasing the locking device, the end of said operating piece being inclined on the side facing said projecting lateral wall of the nut, for the purpose specified.

In testimony whereof I have signed my name to this specification in the presence of two attesting witnesses.

GEORGE HUETTNER.

Witnesses:
 Wm. B. Christie,
 Wm. M. Christie.

Copies of this patent may be obtained for five cents each, by addressing the "Commissioner of Patents, Washington, D. C."